Nov. 13, 1951 L. A. SONTAG 2,574,715
MOBILOMETER
Filed April 19, 1947 6 Sheets-Sheet 1

INVENTOR
LOTHAR A. SONTAG
BY
*Joseph V. Meys*
ATTORNEY

INVENTOR.
LOTHAR A. SONTAG

Nov. 13, 1951     L. A. SONTAG     2,574,715
MOBILOMETER
Filed April 19, 1947     6 Sheets-Sheet 3
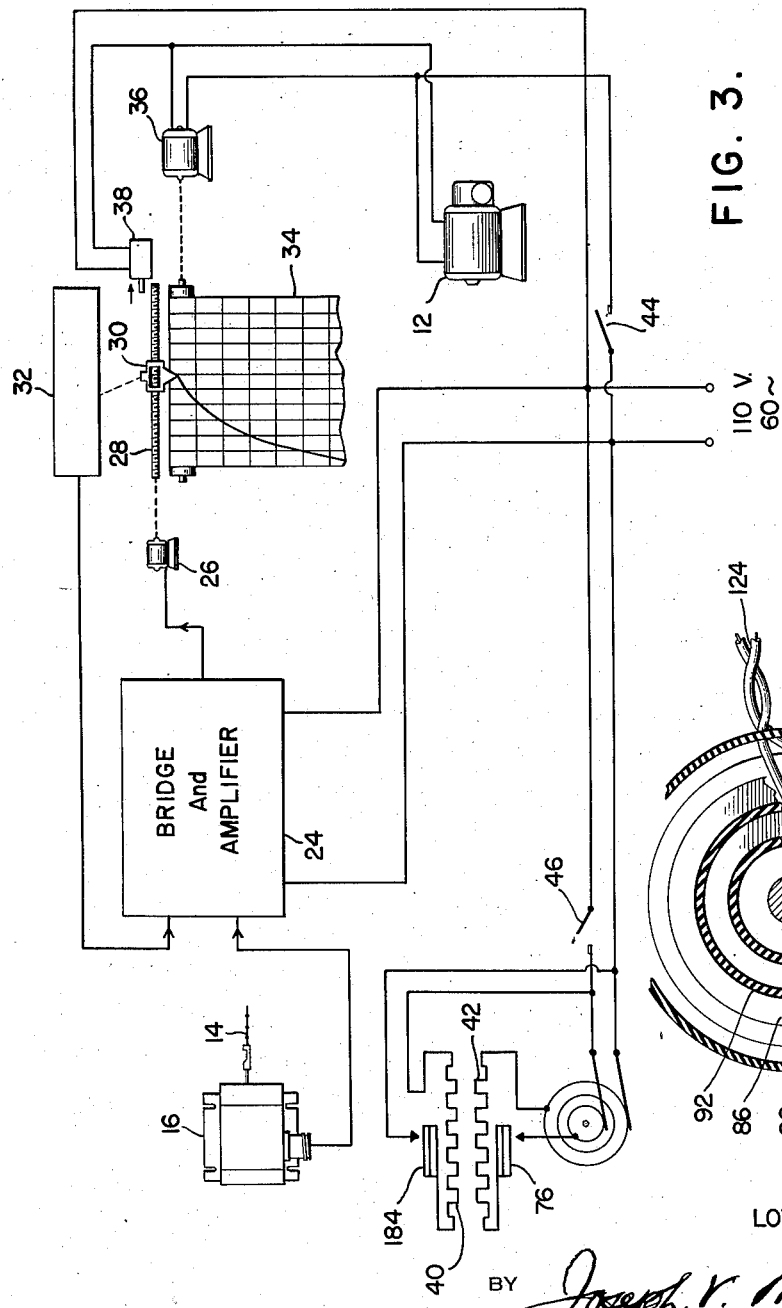
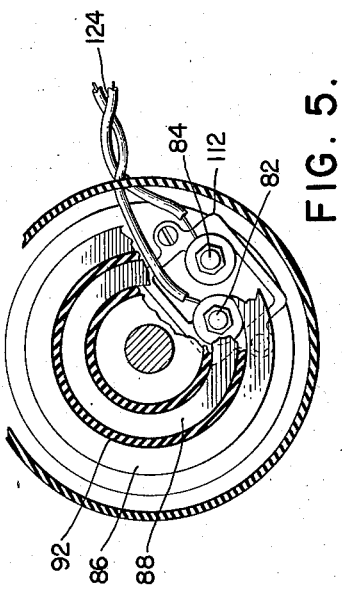
INVENTOR.
LOTHAR A. SONTAG
BY *Joseph V. Meigs*
ATTORNEY

INVENTOR.
LOTHAR A. SONTAG

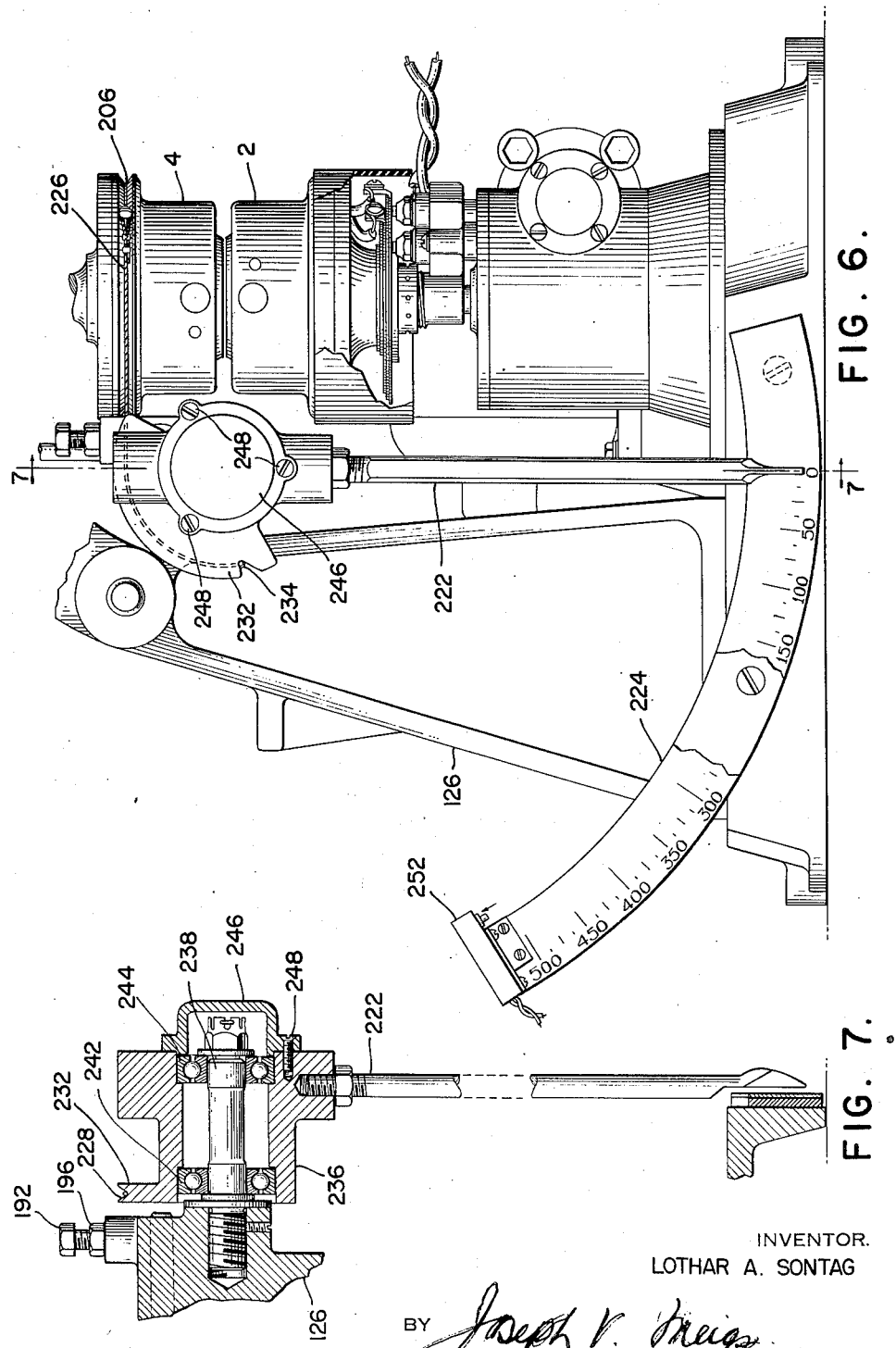

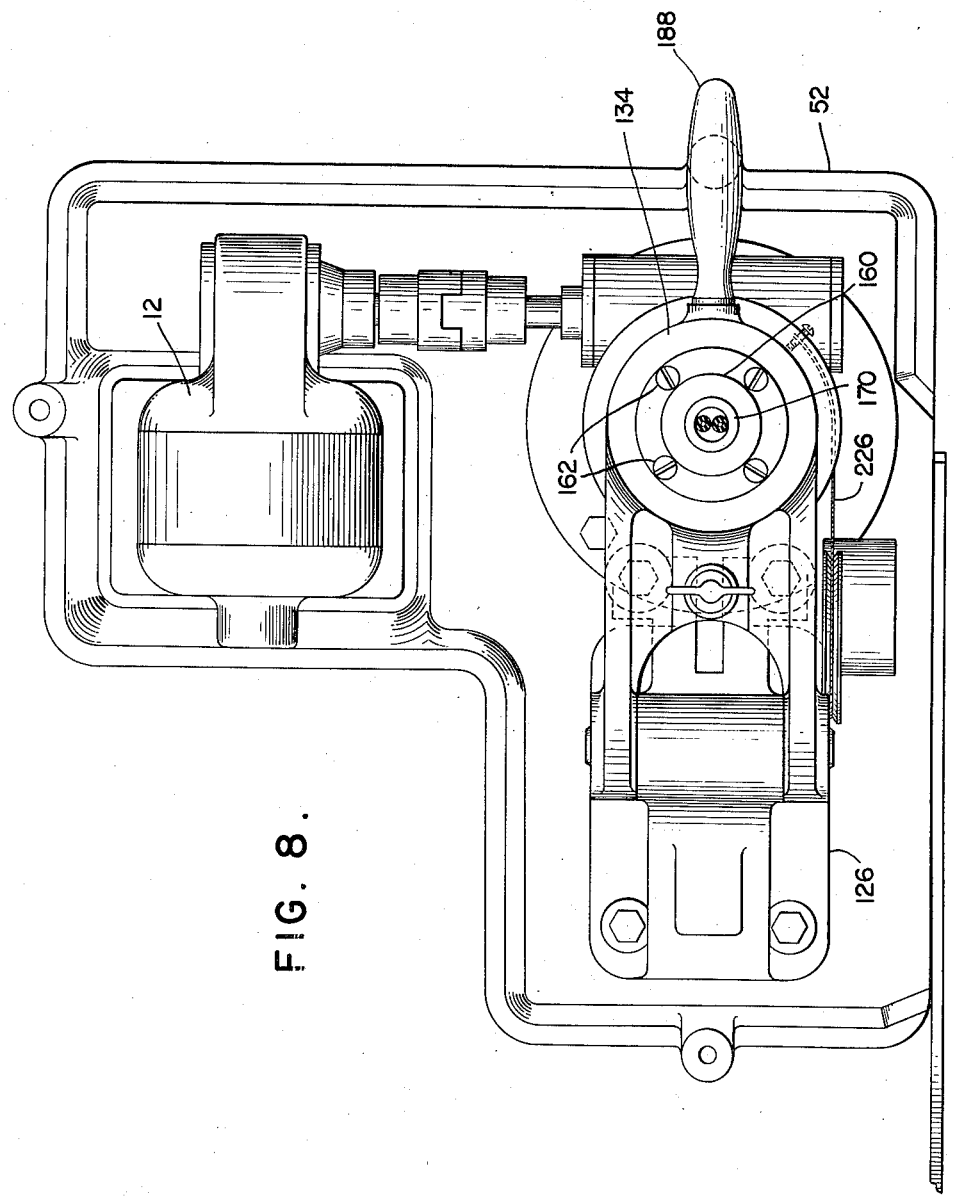

Patented Nov. 13, 1951

2,574,715

UNITED STATES PATENT OFFICE 2,574,715

MOBILOMETER

Lothar A. Sontag, North Tonawanda, N. Y., assignor to Durez Plastics and Chemicals, Inc., North Tonawanda, N. Y., a corporation of New York Application April 19, 1947, Serial No. 742,626

8 Claims. (Cl. 73—15.4)

This invention relates to mobilometers for determining flow characteristics of liquid or plastic materials. It relates more particularly to such instruments for determining and recording automatically the changes in flow characteristics of synthetic resins at elevated temperature.

It has been common practice to make rough comparisons of the bodying characteristics of synthetic resins by smearing a small portion of the resin on a hot plate and rubbing it with a spatula until it forms a hard infusible mass; the time required for setting being obtained from a stop watch. Other methods have been proposed but because of the thermosetting character of the material under test become unpracticable and like the one described above are extremely inaccurate and provide little useful information. Ordinary viscosimeters are unsuited for the purpose because the range of operation is too limited and because there is no adequate provision for cleaning the apparatus once the resin has set to an infusible and insoluble mass. There is therefore a very real need for an instrument which will provide an accurate record of the changes in mobility of synthetic resin as a function of time during the hardening process.

It is accordingly an object of this invention to provide a method of determining accurately and conveniently the change in flow characteristics of resinous materials under controlled conditions of heat treatment.

It is an object of this invention to provide an improved apparatus for determining accurately the resistance to flow of liquid or plastic materials under predetermined conditions.

It is an object of this invention to provide such apparatus for determining continuously the mobility of liquids or plastics over substantial intervals of time under controlled conditions.

It is a further object to provide such an apparatus for recording continually and automatically a measure of the changes in the mobility of deformable substances over substantial intervals of time under controlled temperature conditions.

Still a further object of this invention is to provide an improved apparatus for determining the polymerization or hardening characteristics of liquid or plastic materials over substantial intervals of time under controlled conditions of heat treatment.

It is a further object of this invention to provide mobilometer apparatus having means for measuring the torque transmitted through the substance under test over substantial intervals of time under a variety of conditions of heat treatment.

It is still another object to provide such an apparatus capable of making duplicable measurements of shearing, viscosity or mobility characteristics of a variety of substances and which is convenient and practical to use.

It is a further object to so construct the mechanism that internal normally coadjuvant components may be physically separated without extensive disassembly to permit cleaning or changing of samples.

The invention accordingly contemplates convenient measurement of flow characteristics by determination of force, and changes in force, transmitted by the resinous material under test during controlled heat treatment and, in one aspect of the invention, automatically recording this force as a function of elapsed time. In the preferred embodiment, the test material is confined between opposing smooth surfaces of two rotatably-mounted plates, one of which is rotated by a motor and the other of which is restrained from rotation; the force transmitted to the second plate being measured continually electrical means while the test material is heated to effect transformation to the infusible state; suitable mechanisms and procedures are provided for cleaning and adjusting the apparatus.

A better understanding of these and other objects and advantages of the invention will be had from a consideration of the following description taken in conjunction with the attached drawings, in which similar numbers refer to like components throughout the several views.

Figure 3 is a block diagram of an electrical circuit suitable for use with the mobilometer shown in Figures 1 and 2;

Figure 5 is a section taken on line 5—5 of Figure 4 to show the relationship between the slip rings and the brushes;

Figure 6 is an elevational view of a mobilometer illustrating a second embodiment of the invention;

Figure 7 is a section taken on line 7—7 of Figure 6; and

Figure 8 is a plan view of the mobilometer shown in Figure 6.

Figure 1:
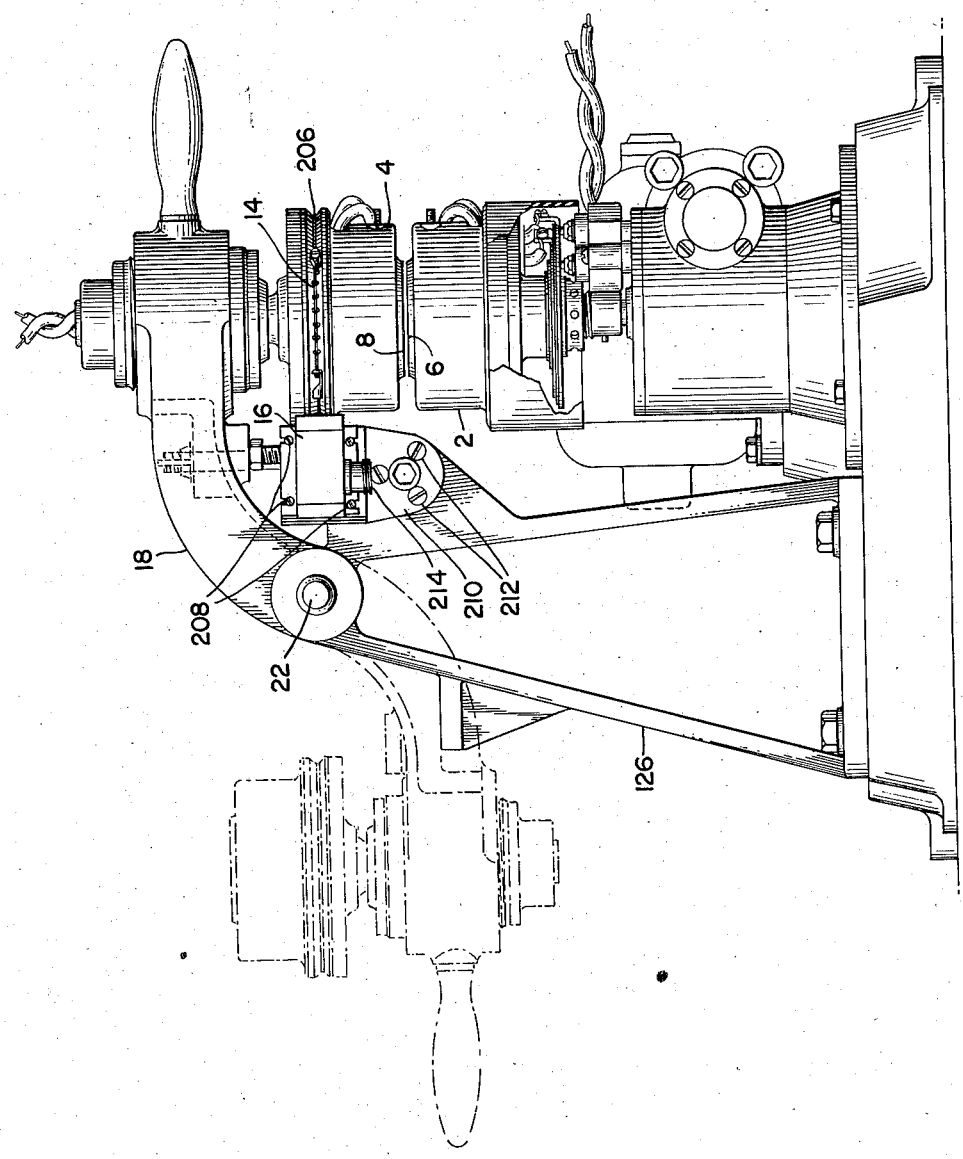
Figure 1 is an elevational view of a mobilometer embodying the invention.
Figure 2:
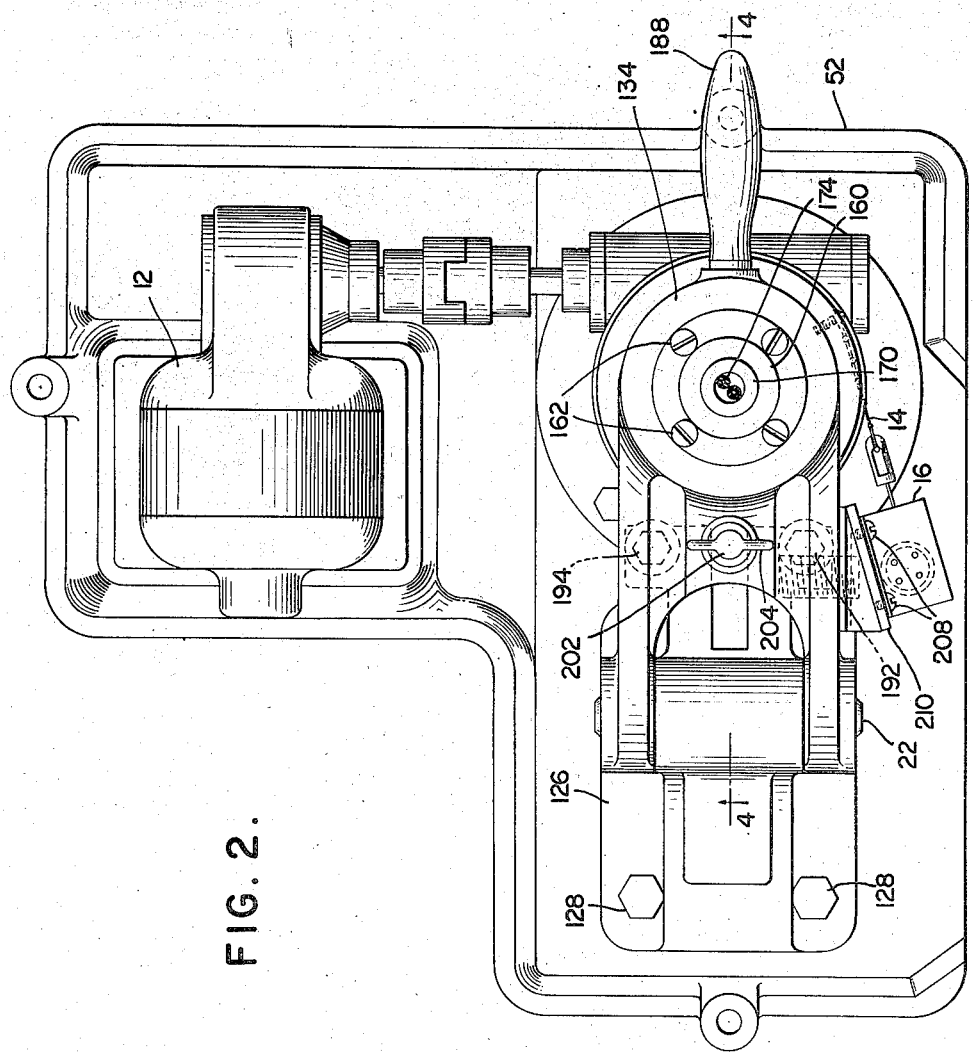
Figure 2 is a plan view of the mobilometer shown in Figure 1.

The mobilometer illustrated in Figures 1 and 2 is designed to vary the value of an electrical quantity, for example, voltage or impedance, in accordance with changes in the torque transmitted through a sample of liquid or plastic material under test. The mobilometer is provided with two steel plates 2 and 4 having circular smooth opposing faces 6 and 8, respectively. The lower plate 2 is adapted to be rotated at constant speed by a motor 12. The sample of material to be tested is placed between the surfaces 6 and 8, which in a typical example are separated by 0.01 inches, and the lower plate 2 is then rotated at constant speed, for example, one revolution per minute. The upper plate 4 is mounted for free rotation but is prevented from rotating by a dynamometer arrangement comprising a length of flexible beaded chain 14 connected between the plate 4 and a strain measuring element 16. Thus as the lower plate 2 is rotated, the torque transmitted from the lower plate surface 6 to the upper surface 8 by the substance under test is translated into an electrical value by the strain sensitive element 16 and is utilized as a measure of the flow characteristics of the substance.

Each of the plates 2 and 4 is provided with an internal thermostatically controlled heating element so that polymerization or heat bodying characteristics of the sample may be ascertained over intervals of time under controlled conditions. Such polymerization may result, at increased temperatures, in very rapid viscosity changes and it is advantageous therefore to connect the strain sensitive element 16 to a suitable recording instrument so that as the mobility characteristics of the sample change during heat treatment, a curve, providing a permanent record of these changes, is drawn by the recording instrument.

The entire upper structure, including the plate 4, is mounted on an arm 18 which is adapted to pivot about a hinge structure 22 so that the upper structure may be placed in the position shown by the broken lines in Figure 1, thus exposing surfaces 6 and 8 to permit cleaning.

The strain sensitive element 16 (Fig. 3) is an unbonded type wire filament strain gage and is calibrated advantageously in units of force exerted on the flexible link member 14. The Statham gage, Model YE-250, manufactured by Statham Laboratories, Los Angeles, Calif., is a gage of this type and has been found entirely suitable for the present application. In this device, fine wire filaments are stressed longitudinally by the force applied to link 14 and the resulting deformation of the wire filaments causes their resistance to change. This change in resistance is measured by a Wheatstone bridge and amplifier arrangement, indicated in block outline form at 24, which drives a reversible motor 26 to move, by means of threaded screw 28, a recording pen 30 to the right or left in accordance with the magnitude of the torque transmitted from plate 2 to plate 4 through the substance under test. A suitable bridge balancing circuit, indicated in block form at 32, operates in conjunction with pen 30 to maintain the Wheatstone bridge in balanced condition. A paper chart 34, on which the record is drawn, is driven at uniform speed by a motor 36. The recording pen 30 may be of the type that indicates the torque continuously or of the intermittent type which records at suitably close spaced intervals of time. In either case, the resulting chart represents changes in the resistance to flow of the sample under test.

The characteristics of many resinous substances are such that under continued heat treatment they become solid materials of exceptionally high strength. If operation of the machine were continued for too long a period of time when testing samples of such material, damage to the mobilometer or strain sensitive elements might result. A limit switch 38, operated by pen 30, is placed therefore in series with the supply circuit of drive motors 12 and 36 to stop the rotation of the lower plate 2 and the travel of chart 34 when the transmitted torque reaches the capacity of the machine as indicated by the position of pen 30. A switch 44 is provided to control the operation of drive motor 12 and chart motor 36. A switch 46 controls the energization of heating elements 40 and 42.

Figure 4:
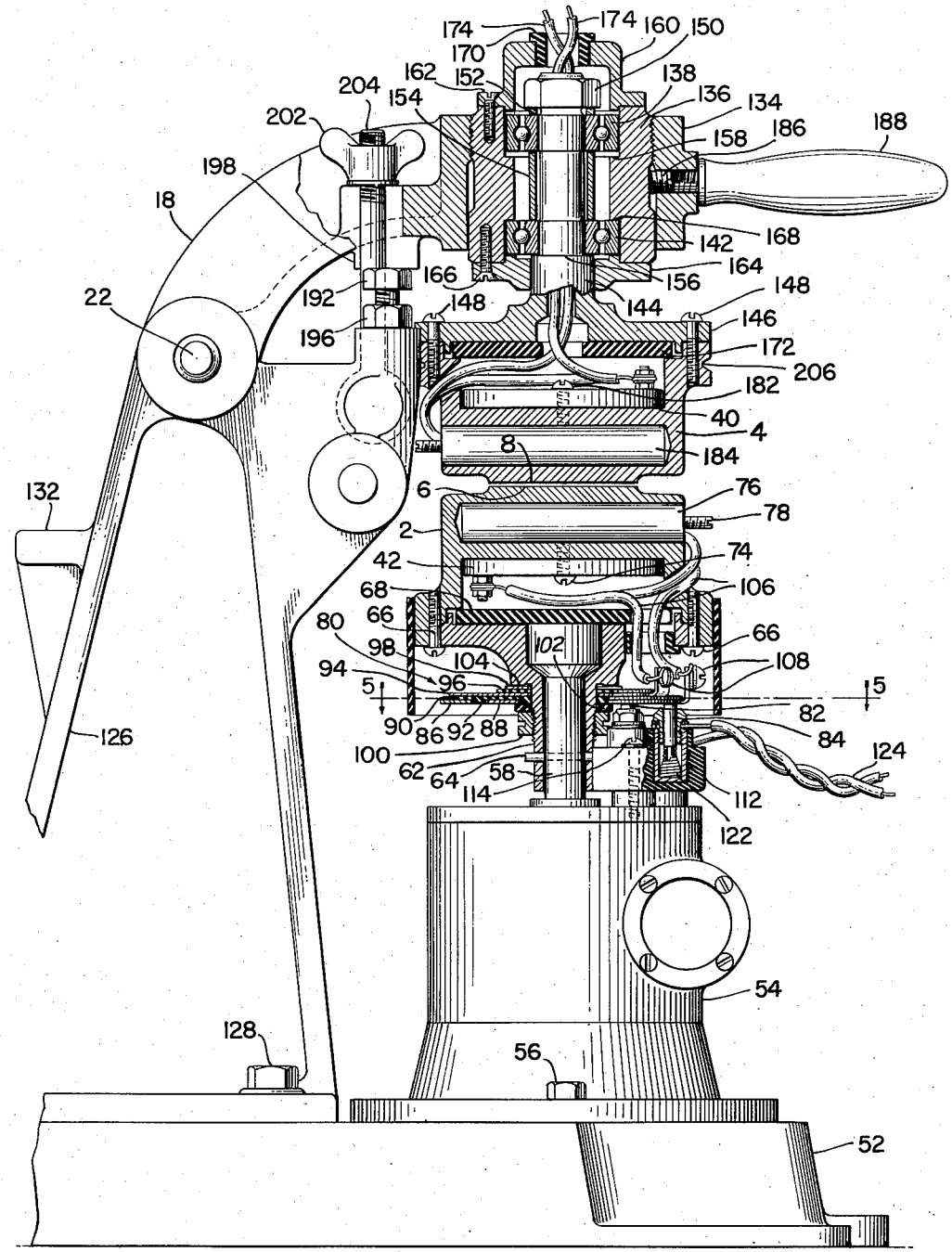
Figure 4 is a partial section taken on line 4—4 of Figure 2.

The details of the working parts of the mobilometer are shown more clearly in Figure 4. The entire unit is mounted on a heavy steel base 52. A gear box 54, through which lower plate 2 is driven by motor 12, is secured by bolts 56 to the base 52. The speed of rotation of plate 2 may be changed by suitable rearrangement of the gears in box 54. A shaft 58 extends upwardly from the gear box 54 to support and drive the lower plate 2. A sleeve 62 surrounding and pinned to shaft 58 by a tapered pin 64, is secured to the bottom of plate 2 by screws 66. A chamber within the plate 2 is closed on the lower side by a plate of insulating material 68 and houses an electrical heating element 42 which is secured to plate 2 by means of a screw 74. Between the heating element 42 and the surface 6 of plate 2, there is mounted a thermostatic control 76 (details not shown) which is adjusted to maintain the surface 6 at the desired temperature by means of an adjustment screw 78.

In order to provide electrical energy for the heating element 42 when the lower plate is being rotated by motor 12, slip rings, generally indicated at 80, are provided. In this example, the slip rings are supported by the sleeve 62 while two carbon brushes 82 and 84 for making contact with the slip rings are supported from the gear box 54. The outer slip ring 86 (see also Fig. 5) and an inner slip ring 88 are secured to an insulating sheath 90 having a downwardly extending annular extension 92 separating the inner and outer slip rings. The insulating sheath 90 is backed on the upper surface by a metal supporting disc 94 which is in turn backed by a smaller sheet of insulating material 96 and a washer 98. The entire assembly is held in place by a nut 100 threaded onto sleeve 62, which through an insulating washer 102 tightens the entire assembly against the shoulder 104. The electrical leads 106 from the heating elements are connected by screws 108 to their respective slip rings. The carbon brush assembly is mounted in an insulating housing 112 of plastic or other suitable material and is secured to gear housing 54 by screws 114. The two carbon brushes 82 and 84 are each biased upwardly by a suitable compression spring as at 122, and are connected, respectively, to one of the leads 124 connected to the source of power for the heating element 42.

The upper structure of the mobilometer is supported from base 52 by a bracket 126 secured to base 52 by bolts 128. The upper assembly is connected to the bifurcated arm 18 (Figure 2) which is hinged for rotation about axle 22. A projection 132 is provided on bracket 126 for supporting the upper structure when the mobilometer is in the open position.

The upper end of arm 18 is formed into an annular ring 134 into which is threaded a bearing supporting sleeve 136. The outer race portions of two thrust bearings 138 and 142 are mounted within the sleeve 136. The inner race portions of the bearings 138 and 142 support a cylindrical extension 144 of a top cap 146 to which is secured the upper plate 4 by means of screws 148. The bearings 138 and 142 are retained in position on the cylindrical extension 144 by downwardly exerted pressure of a nut 150 which holds the assembly of a washer 152, the inner race portion of bearing 138, a spacing sleeve 154, and the inner race portion of bearing 142 in compression against a shoulder 156 on the cylindrical extension 144. The outer race portion of bearing 138 is retained in its lateral position by sleeve 136. The outer race portion of bearing 142 is held in position between a collar 164, secured to sleeve 136 by screws 166, and a shoulder 168 in sleeve 136. Suitable openings are provided vertically through an insulated bushing 170 in a housing 160, nut 150, cylindrical extension 144 and an insulating plate 172 through which pass wires 174 to provide current for the upper heating element 40 which is secured to upper plate 4 by a screw 182. Between the heating element 40 and the surface 8 of the plate 4 is mounted the thermostatic control element 184 constructed in the same manner as that utilized to regulate the temperature of the lower plate surface 6.

The upper plate 4 is thus given lateral support by the arm 18 and is rotatably mounted by the low friction bearings 138 and 142.

The vertical separation between surfaces 6 and 8 is adjusted by screwing sleeve 136 upwardly or downwardly in the threaded portion of ring 134. When the desired spacing adjustment has been made, the sleeve is locked in place by tightening a recessed screw 186 against the surface of sleeve 136. A handle 188, for convenience in pivoting the upper structure about axle 22, is screwed into the outer portion of the same opening in which set screw 186 is recessed.

It is important that horizontal alignment between the surfaces 6 and 8 be maintained and this alignment is secured by adjustment of two bolts 192 and 194 which are threaded into bracket 126 and locked in position by nuts 196. When the mobilometer is placed in the closed position, the downwardly extending projections 198 on the arm 18 rest on the heads of bolts 192 and 194. The arm is then locked in place by a thumb screw 202 threaded onto an eye bolt 204 which extends upwardly from bracket 126 through a slot in arm 18.

An annular groove 206 surrounds a portion of the upper plate 4 for positioning the beaded chain 14 which is connected between the plate 4 and the strain sensitive element 16. The element 16 (Figs. 1 and 2) is mounted by means of screws 208 to a mounting plate 210 which is secured to bracket 126 by screws 212. An outlet 214 is provided for making electrical connection to the measuring and recording circuits.

In operation, switch 46 is first closed to permit plates 2 and 4 to attain the desired temperature as determined by the adjustment of the thermostatic controls 76 and 184. The mobilometer is then opened by removing wing nut 202 and tilting the upper portion of the mobilometer backward to the position shown by the broken lines, exposing the upper and lower plate surfaces 6 and 8. A sufficient amount of the material to be tested, for example, synthetic resin, to fill the space between the plates is placed on the lower surface 6. Arm 18 is then tilted forwardly and wing nut 202 and eye bolt 204 pushed into place and the wing nut tightened. Switch 44 is immediately closed starting drive motor 12 and the recording chart motor 36. The torque transmitted by the resin is recorded automatically along the mobility or viscosity axis on chart 34. If the machine is allowed to run without further attention, the recording pen 30 will strike limit switch 38, when the resin has hardened to such an extent that the maximum safe torque is being transmitted to the upper plate 4, disconnecting the drive motor 12 and the chart motor 36. The plates are then separated and surfaces 6 and 8 are cleaned by scraping or other means.

Curves representing polymerization or bodying characteristics are thus quickly and easily obtained with the particular advantage that they are obtained in chart form so that bodying characteristics of different materials may be accurately and quickly compared.

The chart 34 may be calibrated in purely arbitrary units for comparison purposes, however, it is convenient to calibrate it in terms of the force applied to the strain sensitive element 16. This may be accomplished readily by rotating element 16 to a vertical position and hanging suitable weights on the beaded chain 14. The calibration may be made, alternatively, in terms of poises by calculations based on the readings obtained with the weights and on the geometry of the apparatus.

Although an unbonded type wire strain gage, operating in conjunction with a bridge circuit and recorder, has been disclosed in the above example, it is apparent that many other devices are suitable for measuring and recording the torque transmitted to the upper plate, for example, a magnetic type strain gage would be entirely satisfactory, or mechanically operated recording systems could be employed.

Although the convenience and accuracy of the automatic recording system are very desirable, it is possible to utilize a mechanical indicating device for denoting the instantaneous resistance to flow and by continually observing the readings to prepare, by hand, a graph similar to that produced automatically in the above example. The automatic recording system, however, is to be preferred particularly where substances are being tested which change viscosity very rapidly during polymerization.

Figures 6, 7 and 8 illustrate a second embodiment of the invention in which a pointer 222, in conjunction with a scale 224 gives an instantaneous reading which is a function of the torque transmitted through the sample under test and, therefore, of the resistance to flow.

A light cable 226 is attached to upper plate 4 and, as with the beaded chain 14 in the previous example, is guided by the circumferential groove 206 around the plate 4. The cable extends along a groove 228 in the outer curved surface of a flange 232 to which it is secured at point 234; the flange 232 forming a portion of a rotatably mounted sleeve 236 into which is threaded the pointer 222. The sleeve 236 is supported by a stud bolt 238 threaded into bracket 126; free rotation of pointer 222 being provided by ball bearings 242 and 244 which are protected by a cover-plate 246 secured to sleeve 236 by screws 248.

When force is exerted on the cable 226, by torque transmitted through the test sample between plates 2' and 4 in the manner described above, the pointer 222 is rotated about stud bolt 238 in a clockwise direction and moves along the scale 224 a distance depending upon the magnitude of the force applied to the cable 226. The reading on scale 224 is therefore an indication of the resistance to flow of the material being tested. A limit switch 252 is actuated, in this embodiment, by the pointer 236 and as before is electrically connected to stop motors 12 and 36 when the capacity of the machine is reached. In other respects, this instrument is substantially identical with the mobilometer described above.

From the foregoing, it will be observed that the mobilometer embodying my invention is well adapted to attain the end and objects hereinbefore set forth and to be economically manufactured, since the separate features are well suited to common production methods and are subject to a variety of modifications as may be desirable in adapting the invention to different applications.

As many possible embodiments may be made of the above invention and as many changes might be made in the embodiments set forth, it is to be understood that all matter hereinbefore set forth or shown in the accompanying drawings is to be interpreted as illustrative and not in a limited sense.

I claim:

1. In a system for measuring the rate of change of the physical properties of a heat curable resin during the curing process, apparatus comprising a first rotatably-mounted plate having an exposed horizontal surface, a second plate having a horizontal surface opposed and spaced from the horizontal surface of said first plate, the space between said surfaces being adapted to receive a sample of the resin to be tested, motor means for moving said first plate relative to said second plate, means for heating at least one of said plates to cure said resin, and means operating throughout the curing process for measuring the rate of change in the force communicated through said resin to said upper plate.

2. A mobilometer for determining the rate of change of resistance to flow of a heat curable resin during the curing process comprising, in combination, a first rotatably mounted plate having an exposed horizontal surface, a second rotatably mounted plate having a horizontal surface opposing and spaced from the horizontal surface of said first plate, the space between said surfaces being adapted to receive a sample of resin to be tested, a heating element in each of said plates to cure the resin between said surfaces, motor means for rotating said first plate at substantially constant speed, brake means for resisting rotational tendency of said second plate caused by torque transmitted from said first plate to said second plate by the resin under test, and time-responsive measuring means for determining the rate of change of torque exerted by said brake means to prevent rotation of said second plate.

3. A mobilometer for measuring the changes in mobility of thermal-setting resinous material over the period of time during which the material is exposed to controlled conditions of heat treatment which cause said material to advance from a fusible state to an infusible state, comprising, in combination, a first rotatably mounted plate having a planar surface, a second rotatably mounted plate having a planar surface opposed to and spaced from the surface of said first plate, the space between said surfaces being adapted to receive the sample of material to be tested, means for adjusting the distance between the planar surfaces of the plates to change the volume of the sample receiving space, a thermostatically controlled heating element in each of said plates to produce the desired chemical change in the test material between said surfaces, means for rotating said first plate, means for restricting the rotation of said second plate, and means for indicating the rate of change of force communicated to said second plate from said first plate by the material therebetween, thereby to indicate the change in flow characteristics of the material with relation to the time during which the material is undergoing the transformation to the infusible state.

4. A mobilometer for measuring the changes in mobility of thermal-setting resinous material over the period of time during which the material is exposed to controlled conditions of heat treatment which cause said material to advance from a fusible to an infusible state, comprising, in combination, a first rotatably mounted plate having a horizontal surface, a second rotatably mounted plate having a horizontal surface opposed to and spaced from the horizontal surface of said first plate, the space between said surfaces being adapted to receive the sample of material to be tested, a thermostatically controlled heating element in each of said plates to regulate the temperature of the test material between said surfaces, means for rotating said first plate, and means for automatically and continually recording as a function of time the force communicated to said second plate from said first plate by the material under test, thereby to produce a chart denoting the change in flow characteristics of the material under test as a function of time and under the controlled conditions of heat treatment which produced the transformation to the infusible state, and limit switch means for deenergizing said motor means when a predetermined force is communicated to said second plate by said material, to thereby prevent damage to the mobilometer.

5. A method of measuring changes in mobility of a heat-setting resinous material, which comprises confining said resinous material between opposed surfaces, applying continuous transverse movement to one of said surfaces causing said material to transmit force to said other surface in accordance with the flow characteristics of said material, applying sufficient heat to said material to produce the transformation to an infusible state, and continually measuring the force transmitted to said other element as a function of the time of said transformation, said force increasing in accordance with the decrease in mobility of said resin corresponding with its stage of advancement from the fusible to the infusible state.

6. A mobilometer for measuring the curing time of a heat-curable material comprising first and second plates each having continuous substantially planar surfaces, said surfaces being spaced from and opposed to each other to accommodate said material therebetween, motor means for continuously rotating said first plate, a heating element positioned in the interior of at least one of said plates to regulate the temperature of said material between said surfaces, manually adjustable means for pre-setting and maintaining the distance between said surfaces, a limit switch operable in response to the transmission of a predetermined force from said first plate to said second plate through the said material, circuit means under the control of said limit switch for de-energizing said motor means, and timing means for measuring the time required to cure said material sufficiently to cause transmission therethrough of said predetermined force.

7. In a device for testing the hardening characteristics of thermo-setting resins and the like, apparatus comprising a supporting frame, a lower rotatable plate supported by said frame, motor means for rotating said lower plate, an upper plate, hinged means pivotally supporting said upper plate from said frame, first stop means for supporting said upper plate in a first position wherein it is spaced above said lower plate, the space between said plates being adapted to receive a sample of the resin to be tested, second stop means arranged to support said upper plate in a second position after movement of said upper plate through an angle of substantially 180 degrees from said first position, means for heating said resin to produce a chemical change therein whereby said resin is converted into an infusible state, and means for measuring continually the rate of change in torque transmitted by said resin sample to said upper plate as said chemical reaction takes place.

8. A device for measuring the rate of hardening of thermo-setting resin comprising a lower driven plate forming part of a lower housing, said housing being supported on a rigid vertical lower driving shaft, motor means arranged to drive said shaft, an upper plate forming part of an upper housing, a rigid upper shaft connected to said housing, vertical bearings rotatably supporting said shaft, said plates having opposed horizontal surfaces, means supporting said surfaces in adjustably predetermined spaced relation to hold resin therebetween, heating means in each of said housings to heat the resin, said upper shaft being supported in an upper shaft housing forming part of a hinged arm movable vertically to move the upper plate and upper housing vertically and away from the lower plate, means carried by the upper housing and connected to a force-measuring device to measure the torque communicated to the upper housing by the lower housing through the intervening resin, a limit switch under the control of said force-measuring device arranged to deenergize said motor when a predetermined force is attained, and timing means operating throughout the measurement to permit determination of the rate of hardening of said resin.

LOTHAR A. SONTAG.

REFERENCES CITED

The following references are of record in the file of this patent:

UNITED STATES PATENTS

| Number | Name | Date |
| --- | --- | --- |
| 1,327,838 | Naylor | Jan. 13, 1920 |
| 1,441,564 | Eberly | Jan. 9, 1923 |
| 2,026,297 | Bell | Dec. 31, 1935 |
| 2,043,127 | Stephens | June 2, 1936 |
| 2,066,016 | Rossi | Dec. 29, 1936 |
| 2,070,862 | Healy | Feb. 16, 1937 |
| 2,096,222 | Bock | Oct. 19, 1937 |
| 2,133,674 | Stamback | Oct. 18, 1938 |
| 2,410,385 | Loukomsky et al. | Oct. 29, 1946 |